United States Patent [19]
Gresa

[11] Patent Number: 5,490,922
[45] Date of Patent: Feb. 13, 1996

[54] WASTE WATER PLANT WITH BUILT-IN MESH SCREEN UNIT

[75] Inventor: Louis Gresa, Hinwil, Switzerland

[73] Assignee: Romag Rohren und Maschinen AG, Dudingen, Switzerland

[21] Appl. No.: 240,765

[22] PCT Filed: Sep. 24, 1993

[86] PCT No.: PCT/EP93/02594

§ 371 Date: Jul. 20, 1994

§ 102(e) Date: Jul. 20, 1994

[87] PCT Pub. No.: WO94/07585

PCT Pub. Date: Apr. 14, 1994

[30] Foreign Application Priority Data

Sep. 25, 1992 [CH] Switzerland .............. 3015/92

[51] Int. Cl.$^6$ .................................. B01D 77/01
[52] U.S. Cl. ............ 210/159; 210/162; 210/170; 210/413
[58] Field of Search .................. 210/153, 154, 210/159, 162, 170, 298, 299, 305, 413, 459

[56] References Cited

U.S. PATENT DOCUMENTS

| | | | |
|---|---|---|---|
| 799,829 | 9/1905 | Church | 210/162 |
| 909,484 | 1/1909 | Auken | 210/305 |
| 1,035,480 | 8/1912 | Schodde | 210/305 |
| 1,474,938 | 11/1923 | Marsh | 210/305 |
| 1,758,743 | 5/1930 | Harman | 210/305 |
| 1,825,169 | 9/1931 | Wyckoff | 210/154 |
| 4,134,833 | 1/1979 | McCormick | 210/305 |
| 4,689,145 | 8/1987 | Mathews et al. | 210/170 |
| 5,277,799 | 1/1994 | Bransch | 210/162 |

FOREIGN PATENT DOCUMENTS

| | | |
|---|---|---|
| 3589502 | 3/1990 | European Pat. Off. . |
| 2743580 | 3/1979 | Germany . |
| 487803 | 6/1938 | United Kingdom . |
| 9221837 | 12/1992 | WIPO . |

*Primary Examiner*—Christopher Upton
*Attorney, Agent, or Firm*—Oblon, Spivak, McClelland, Maier & Neustadt

[57] ABSTRACT

A sewage water installation has a discharge basin in which is arranged a screening unit linked to a back-and-forth movable cleaning carriage. The discharge basin (20) is subdivided by a partition (24) and by the screening unit (30) into a storage chamber (25') and an outflow chamber (25"). The storage chamber (25') is linked to an inflow pipe (26) and to an outflow pipe (27) and the outflow chamber (25") is linked to an outflow pipe (28). In order to increase the storage volume and to reduce the throughflow speed, a retaining element (40) is arranged on the back-side of the screening unit (30), as seen in the direction of flow, inclined so as to form an angle therewith.

13 Claims, 6 Drawing Sheets

5,490,922

WASTE WATER PLANT WITH BUILT-IN MESH SCREEN UNIT

TECHNICAL FIELD

The invention relates to a waste water plant, comprising a discharge basin, connected to at least one inflow pipe and at least one outflow pipe, and a mesh screen unit, which is disposed in said discharge basin and which includes a mesh screen, comprising parallel screen bars, and a cleaning car, which can be moved back and forth and to which is attached a cleaning comb, which is arranged with teeth between the screen bars of the mesh screen.

BACKGROUND ART

Waste water plants with mesh screens, which are installed according to the dimensioned channels, in order to retain bulky floating debris, such as pieces of wood, plastics, paper and the like, are well-known. In these plants so called flood discharges, through which a portion of the rain water mixed with sewage is discharged when there is heavy rainfall, are installed at different points. To avoid the discharge of sewage and rain water loaded with floating and suspended debris, so called discharge basins can be assigned, in which the mixed water is stored. With respect to a waste water plant of the aforementioned kind, a mesh screen unit is known from the EP-A 0 358 952. Said mesh screen unit comprises a mesh screen, which consists in essence of parallel screen bars, between which are arranged triangular teeth of a cleaning comb, which can be moved back and forth and is intended for cleaning the screen bars.

DISCLOSURE OF THE INVENTION

The invention is based on the problem of improving a waste water plant of the aforementioned kind to the effect that while avoiding the risk of backwater and without reducing the volume of impoundment even when the rain weather persists for a long time, in particular, however, during thunder storms, the volume of mixed water, which accumulates in a relatively short period of time and is heavily loaded with floating debris, can be absorbed and, liberated of the floating debris, can be discharged as cleaned waste water.

This problem is solved according to the invention by means of the features stipulated in patent claim 1. Advantageous embodiments of the invention follow from the dependent claims.

While retaining an optimal cleaning effect, the passage rate can be smoothed out and the pressure can be distributed more uniformly over the entire surface of the mesh screen unit with the invention.

BRIEF DESCRIPTION OF THE DRAWINGS

Other features of the invention follow from the following description with reference to the drawings.

BEST METHODS FOR CARRYING OUT THE INVENTION

Figure 1:
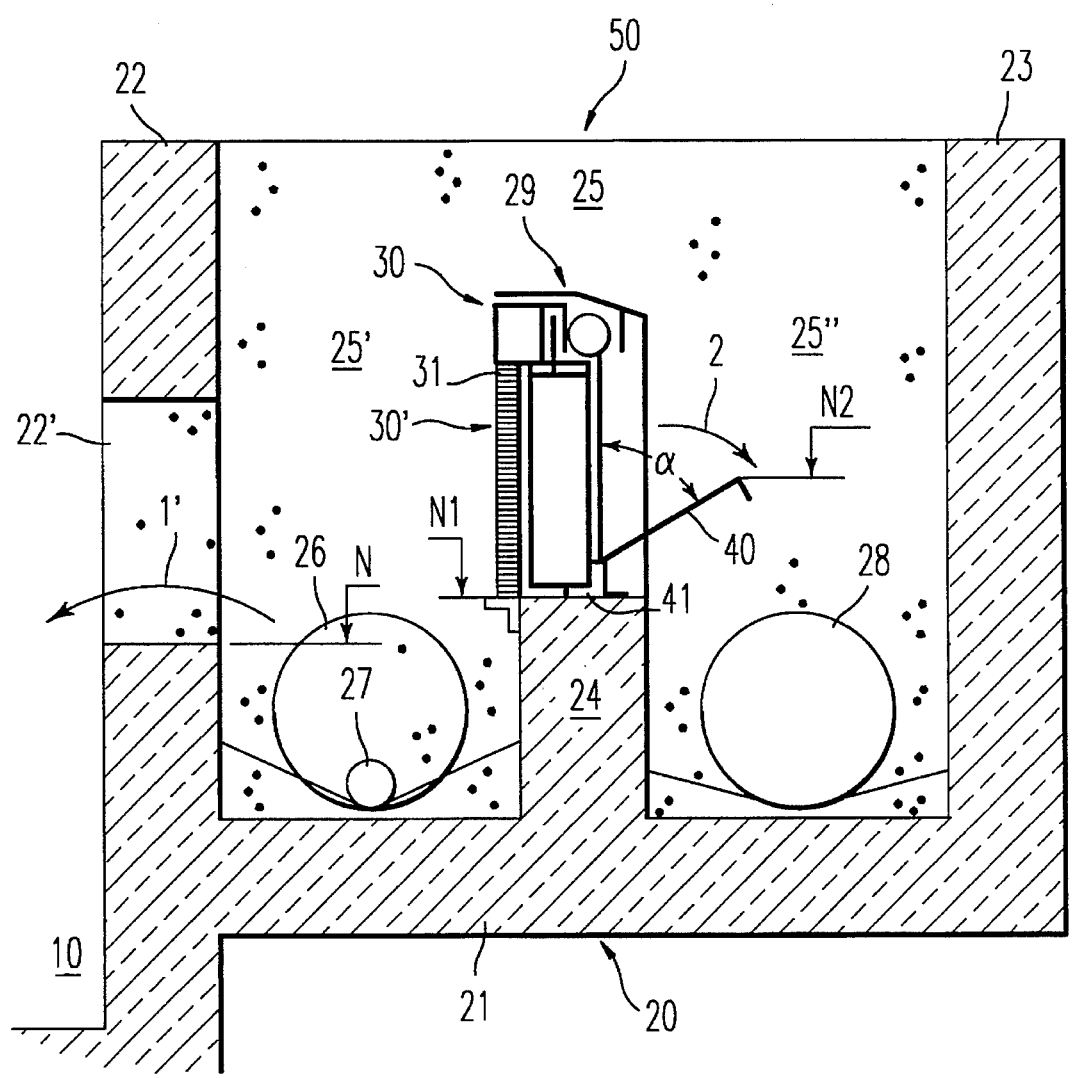
FIG. 1 is a diagrammatic sectional view of a fragment of a first embodiment of a waste water plant with built-in mesh screen unit.

FIG. 1 is a diagrammatic sectional view of a fragment of a waste water plant, which is denoted in its entirety as 50 and which consists in essence of a retarding basin 10, a part of which is illustrated, and a discharge basin 20, which is connected to said retarding basin by way of an overflow opening 22'.

The discharge basin 20 has a bottom 21 and two side walls 22 and 23, which are spaced apart; a front wall 19 and a rear wall 18 and a partition 24, which is arranged in the illustrated example in the longitudinal direction of the discharge basin 20. A basin chamber 25, formed by the bottom 21 and by the side walls 22 and 23 and by the front wall and rear wall 19, 18 as well, is subdivided by means of the partition 24 into a storage space (inflow space) 25' and an outflow space 25". The overflow opening 22' extends virtually over the entire length of the side wall 22. The storage space 25" is connected to an inflow pipe 26, which penetrates the front wall 19, and an outflow pipe 27, which penetrates the rear wall 18. An outflow pipe 28, which penetrates the rear wall 18, is assigned to the outflow space 25".

Furthermore, FIG. 1 shows a mesh screen unit 30, which is depicted schematically and is mounted on the partition 24 and whose upper edge 29 forms an emergency discharge from the storage space 25' to the outflow space 25". The mesh screen unit 30 includes a mesh screen 30', which is depicted schematically and has parallel spaced screen bars 31. A cleaning car 35 (FIG. 2), which can be moved back and forth, is allocated to the mesh screen 30'. If the mesh screen 30' is longer, several cleaning cars can also be provided.

A preferred cleaning car, which is provided with teeth that are designed correspondingly and arranged between the screen bars of the mesh screen, is known from the aforementioned EP-A 0 358 952, where other cleaning elements liberating the mesh screen floating debris can also be installed.

A damning element in the form of retaining element 40 is provided, which is formed as a weir and is shown schematically, is attached to the rear and outflow side of the mesh screen 30'. The retaining element 40, projecting into the outlet space 25" is sloped at an angle α relative to the mesh screen 30' that lies in the verticle plane and is attached to the partition 24 and fastened with means that are not illustrated. A schematically illustrated holding and fastening mechanism 41 is designed in such a manner that the retaining element 40 can be adjusted in its relative position to the mesh screen 30' and can be fixed in the desired position. Depending on the load which is a function of the volume of water that accumulates, the relative position of the retaining element 40 to the mesh screen 30' can be adjusted and fixed in position, with suitable means, for example, a sensor control.

With the additional retaining element 40, forming a level N2, the level N1 of the outlet from the storage space 25' to the outflow space 25" is raised. The result is that, on the one hands the volume of impoundment is increased and, on the other hands the water pressure is distributed virtually uniformly over the entire surface of the mesh screen. Furthermore, the passage rate of the water through the bottom regions of the mesh screen 30' is reduced, with the result that the floating debris can be retained better by means of the individual screen bars and thus an optimal cleaning effect is achieved. The reduction in the passage rate also allows the existing floating debris to no longer be dragged along.

Figure 2:
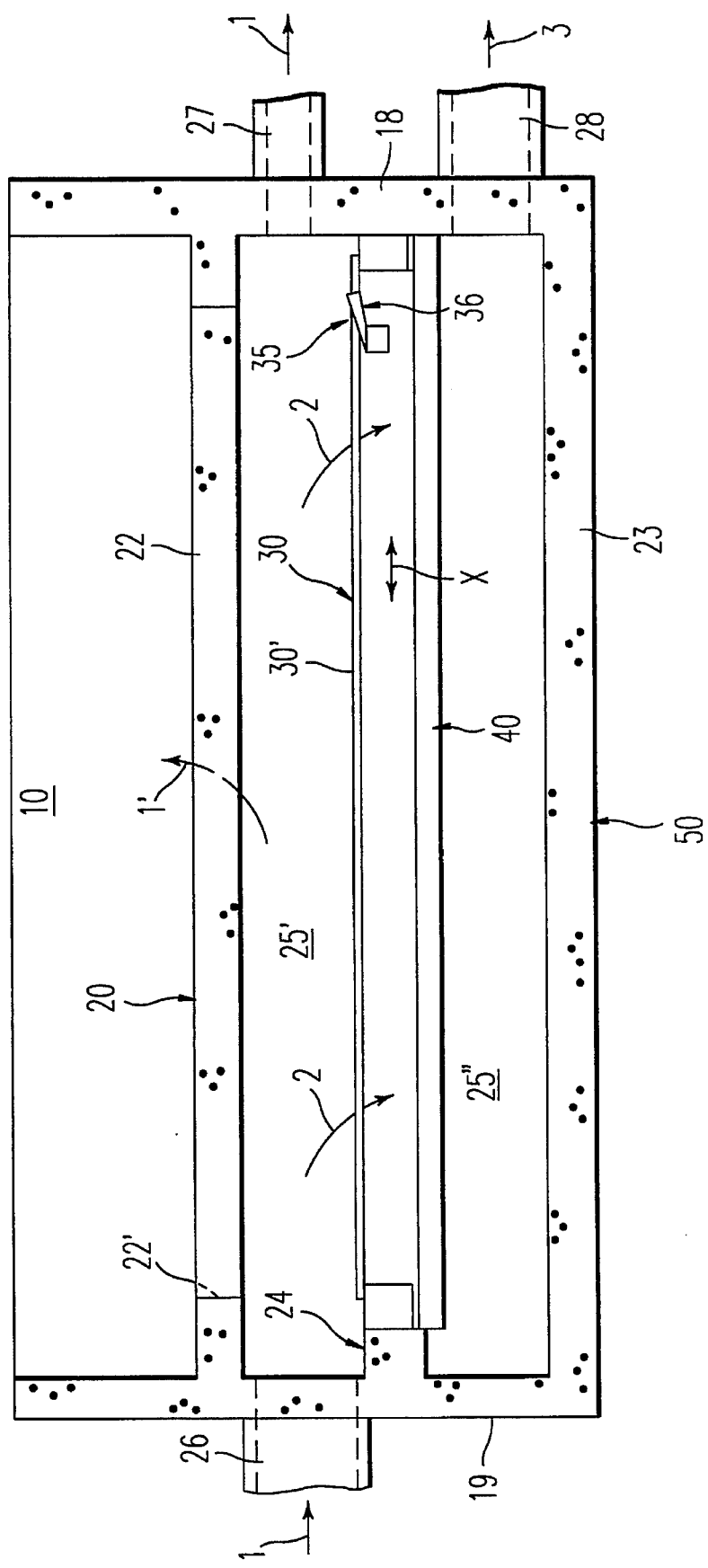
FIG. 2 is a top view of the waste water plant according to FIG. 1.

FIG. 2 is a top view of the waste water plant 50 and depicts the discharge basin 20, which is arranged next to the retarding basin 10, which is shown schematically, and is formed in essence by the front wall 19 and the rear wall 18, the two side walls 22 and 23 and the partition 24. Furthermore, one recognizes the mesh screen 30' of the mesh screen unit 30 (illustrated schematically) and the cleaning car 35, which can be moved back and forth in the direction X of the double arrows by means of means that are not shown and which is provided with teeth 36 designed triangularly and arranged between the screen bars 31 of the mesh screen 30'.

Attached to the front wall 19 is the inflow pipe 26, through which the waste water or the rain water is fed in the direction of arrow 1 to the inflow space 25'. The waste water is discharged, on the one hand, through the pipe 27 in the direction of arrow 1" and is guided at the specific level N, as shown in FIG. 1, through the opening 22' in the direction of arrow 1' into the retarding basin 10. Upon reaching a level N2, the waste water is guided in the direction of arrow 2 through the mesh screen 30' and over the upper edge of the retaining element 40 into the outflow space 25" and is drained in the direction of arrow 3 through the outflow pipe 28 as water cleaned of floating debris.

Figure 3:
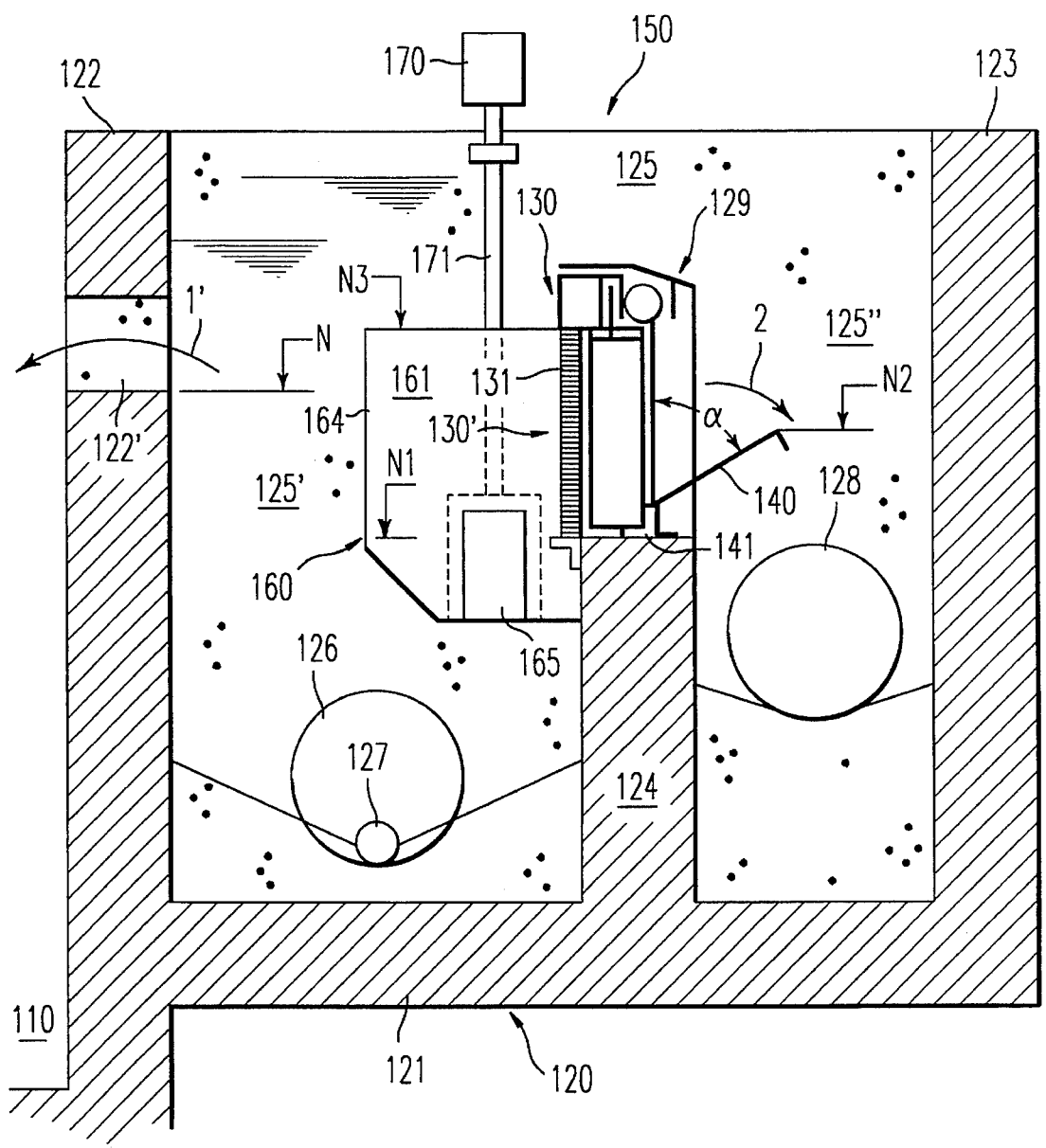
FIG. 3 is a diagrammatic sectional view of a fragment of a second embodiment of a waste water plant.

FIG. 3 is a schematic sectional view of a fragment of a second embodiment of a waste water plant, which is denoted in its entirety by reference number 150 and which includes in essence a partially illustrated retarding basin 110 and a first discharge basin 120, connected by way of an overflow opening 122' to said retarding basin.

The waste water plant 150 corresponds in essence to the waste water plant 50 described above with reference to FIG. 1 and FIG. 2.

The waste water plant 150 includes the discharge basin, comprising a bottom 121, two side walls 122 and 123, a front wall 119 and a rear wall 118, and a partition 124, oriented in the longitudinal direction of the discharge basin 120. The side wall 122 has an overflow opening 122', which extends virtually over the entire length of the side wall 122. A basin chamber 125, formed by means of the bottom 121 and by means of the side walls 122 and 123 and the front and rear wall 119, 118, is subdivided by means of the partition 124 into a storage space 125' and an outflow space 125". The storage space 125' is connected to an inflow pipe 126, penetrating the front wall 119, and an outflow pipe 127, penetrating the rear wall 118. An outflow pipe 128 is connected to the outflow space 125". Furthermore, FIG. 3 shows a mesh screen unit 130, which is shown schematically and is attached to the partition 124 and which exhibits a mesh screen 130' with screen bars 131 that are spaced parallel to each other. A cleaning car 135 (FIG. 4) that can be moved back and forth in the longitudinal direction is attached to the mesh screen 130'. An upper edge, which is denoted as 129 and belongs to the mesh screen unit 130, forms in essence a so called emergency discharge of the storage space 128' to the outflow space 125".

A retaining element 140, which is formed as a weir and is shown schematically, is attached to the rear and outflow side of the mesh screen 130'. The retaining element 140, projecting into the outlet space 125", is sloped at an angle α relative to the mesh screen 130', is attached and fastened to the partition 124. A schematically illustrated holding and fastening mechanism 141 is designed in such a manner that the retaining element 140 can be adjusted in its relative position to the mesh screen 130' and can be fixed in the desired position. Depending on the load which is a function of the volume of water that accumulates, the relative position of the retaining element 140 to the mesh screen 130' can be adjusted and fixed in position, with suitable means, for example, sensor control.

Figure 4:
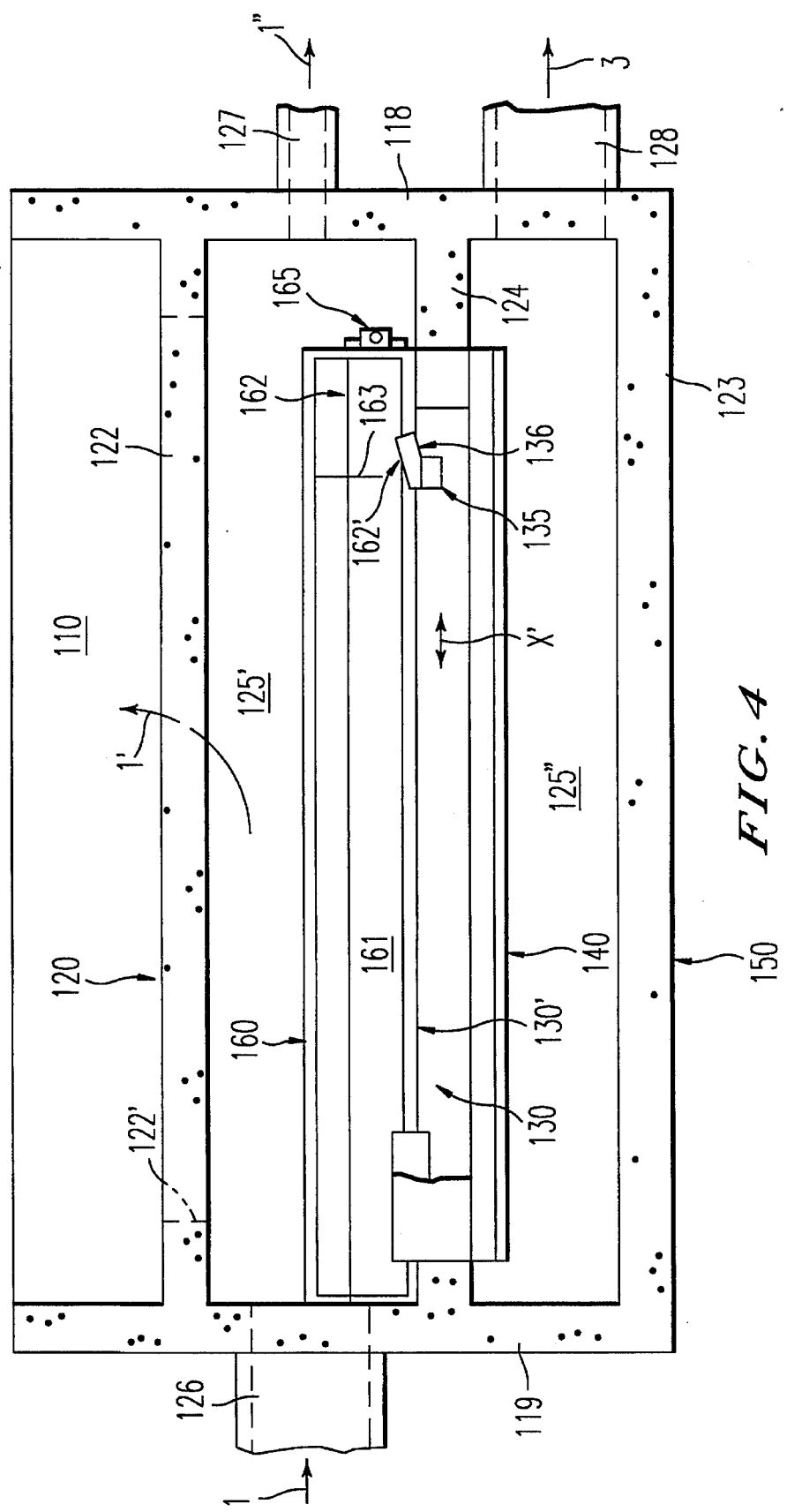
FIG. 4 is a top view of the waste water plant according to FIG. 3.

FIG. 4 is a top view of the waste water plant 150; and one recognizes the first discharge basin 120, which is arranged next to the retarding basin 110, of which a part is shown schematically and which is formed in essence by the front wall 119 and the rear wall 118, the two side walls 122 and 123 and the partition 124. Furthermore one recognizes the mesh screen 130' of the mesh screen unit 130 (illustrated schematically) and the cleaning car 135, which can be moved back and forth in the direction X' of the double arrows by means that are not shown and which is provided with teeth 136 designed triangularly and arranged between the screen bars 131. Attached to the front wall 119 is the inflow pipe 126, through which the waste water is fed in the direction of arrow 1 to the inflow space 125'.

At variance with the first embodiment according to FIG. 1 and FIG. 2, the second embodiment according to FIG. 3 and FIG. 4 has a second discharge basin 180, assigned to the mesh screen unit 130, in the inflow space 125' of the first discharge basin 120. The second discharge basin 160 forms a preliminary chamber 161, which is upstream of the mesh screen 130' and whose upper region exhibits an overflow edge 184 (FIG. 3). The preliminary chamber 161 of the second discharge basin 160 is subdivided, as shown in FIG. 4, by means of a separating wall 163 in order to form a screening shaft 162, whereby the preliminary chamber 161 and the screening shaft 162 are connected together by means of an opening 162'.

The screening shaft 162 serves to receive the screening supplied from the mesh screen 130'. In the bottom region of the second discharge basin 160 the screening shaft 162 has a sliding element 165 in order to drain the screening (not illustrated). To open and close the sliding element 165, said sliding element is operatively connected to a drive 170 by way of a pulling element 171.

In this embodiment according to FIG. 3 and FIG. 4, the waste water fed through the pipe 126 to the inflow space 125' is discharged through the pipe 27 in the direction of arrow 1". Upon reaching a level N2, the waste water is guided, as shown in FIG. 3, in the direction of the arrow 1' into the retarding basin 110. Upon reaching a higher level N3 in the inflow space 125', the waste water flows into the preliminary chamber 161 of the second discharge basin 160 and is retarded therein until the level N2 of the additional retaining element 140 has been reached; said level being raised with respect to the level N1 (overflow edge of the partition 124). The water flowing in the direction of the arrow 2 through the mesh screen 130' over the retaining element 140 flows into the outflow space 128 and is then discharged as water cleaned of floating debris.

At this point it must be pointed out that the retaining element 40 or 140 As attached to the partition 24 or 124 or optionally also to the mesh screen unit, forming an angle of α or α' whose order of magnitude ranges form 30° to 45'. Owing to the adjustable slope of the retaining element 40 or 140 relative to the mesh screen unit 30 or 130, the passage rate can be set.

Figure 5:
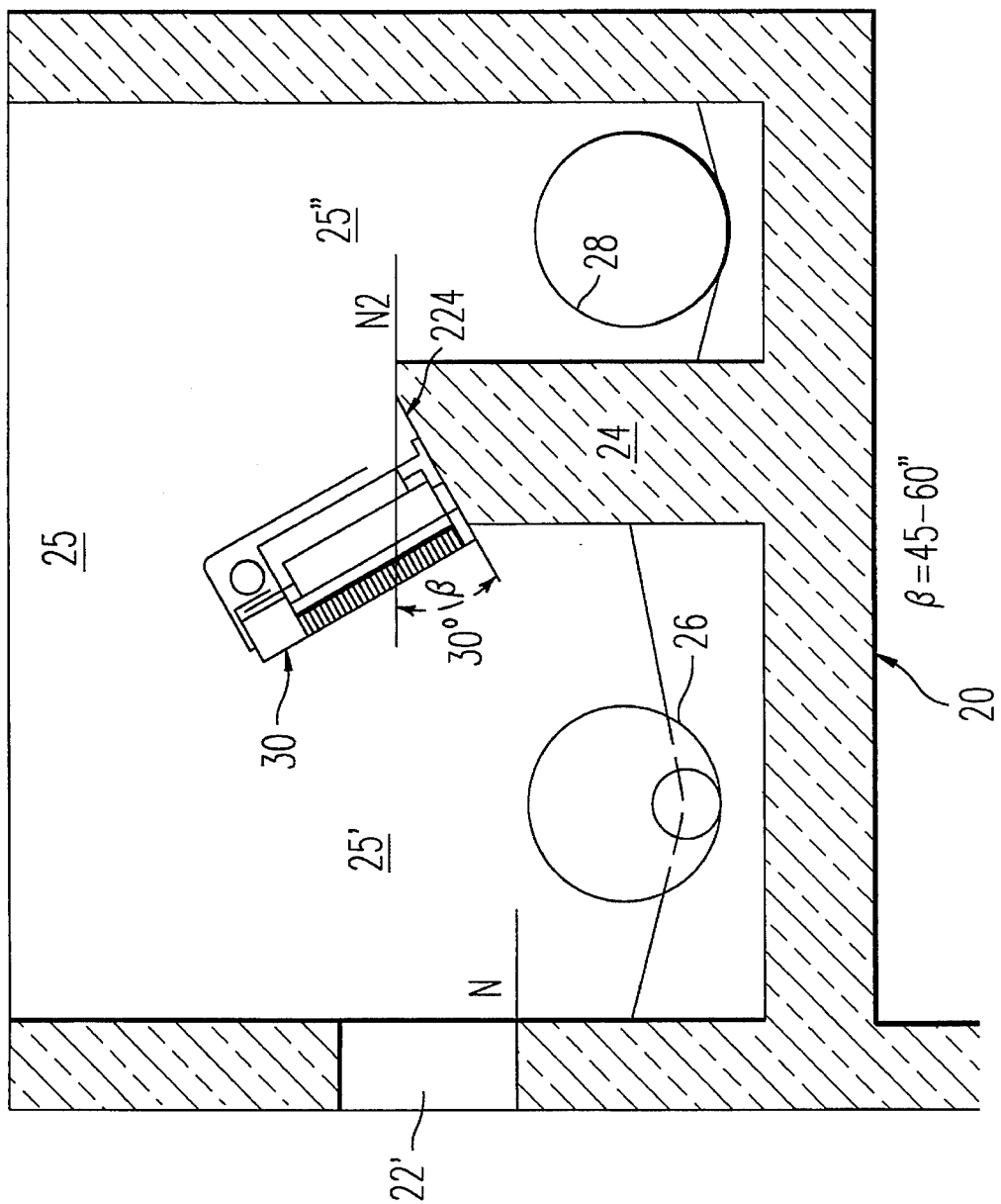
FIG. 5 depicts a modification of the embodiment according to FIGS. 1 and 2.

FIG. 5 depicts a modified design of the embodiment according to FIGS. 1 and 2. With the exception of the following stipulated modifications this modified design agrees completely with the embodiment according to FIGS. 1 and 2 and thus is not explained in detail.

The design according to FIG. 5 deviates from that according to FIG. 1 in that the mesh screen unit 30 is sloped, and in such a manner that its upper edge is tilted in the direction to the inflow space 25'. To obtain a stable support of the tilted mesh screen unit 30 on the partition 24, the surface—flat in the embodiment according to FIG. 1—of the partition 24 is also sloped, so that the mesh screen unit 30 rests with its underside flat on the upper side of the partition 24. Since the mesh screen 30' is attached to the side of the mesh screen unit 30 facing the inflow space 25' and agrees with its bottommost point in essence with the side face of the partition 24 facing the inflow space 25', the upper edge of the side face of the partition 24 facing the outflow space 25" is clearly higher than the bottommost point of the mesh screen 30'. Sloping the mesh screen unit with respect to the sloped surface of the partition 24 allows the sloped surface 224 of the partition 24 itself to assume the function of the retaining element 40 according to FIG. 1, i.e. forms this retaining element. As an alternative, a separate retaining element can also be put shape-lockingly on the upper surface 224, for example, in the form of thin sheet metal, in order to protect the upper side 224 of the partition 24 from the effect of the water flowing over maid upper side.

In this embodiment the mounting of the retaining element is drastically simplified; or, as stated above, a separate retaining element (with the exception of the sloped surface 224 of the partition 24) can be dispensed with, so that the complexity of this embodiment is correspondingly reduced.

In an especially simple manner the retaining element can be formed directly by means of the base plate of the mesh screen unit 30', with which base plate this mesh screen unit, which covers the upper side 224 and is optionally pulled down over the edges to the side face of the partition 24, is mounted on the partition. Thus, the base plate assumes the additional function of impounding the water level on the inflow side.

Another advantage of tilting the mesh screen unit 30 lies in the fact that the water can flow better back out of the screen to the inflow channel, when the water level in the inflow channel begins to drop. Thus, the residual impounded water can be prevented reliably from remaining in the mesh screen unit after the inflow-sided water level has dropped to the normal level.

Furthermore, the tilting of the mesh screen unit has the advantage that the screening can be stripped better in the final position of the cleaning comb, since the screening falls off better. Thus, there is no risk of the screening accumulating in large quantities in the outer regions of the mesh screen.

Furthermore, the hydraulic unit, which is mounted on the upper side of the mesh screen 30' and drives the cleaning comb(s) is situated higher or farther away from the outflow level, so that the risk of soiling or polluting the hydraulic unit is reduced.

The angle between the horizontal plane and the base plate of the mesh screen unit 30' or the upper side 224 of the partition 24 is 30° according to FIG. 5. However, the angle of inclination can vary from 15° to 60°. Preferably it ranges from 30° to 40°, since optimal results can be obtained here with respect to the advantages explained above.

Figure 6:
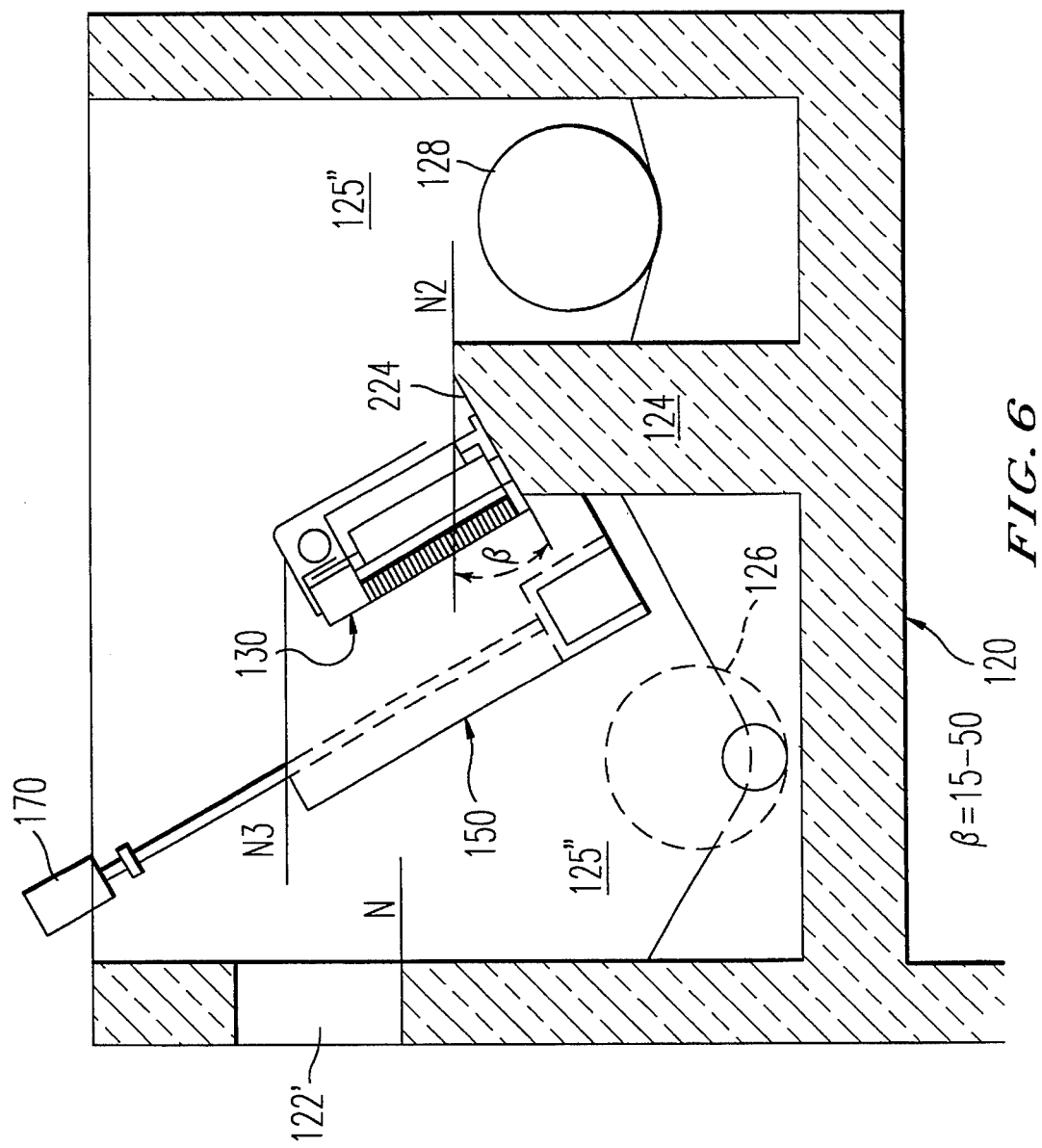
FIG. 6 depicts a modification of the embodiment according to FIGS. 3 and 4.

FIG. 6 shows a modified design of the embodiment according to FIG. 3 and 4.

As evident, here, too, the mesh screen unit 130 is tilted just as in the design according to FIG. 5. All of the above statements with respect to the tilting of the mesh screen units the design and the arrangement of the retaining element, the advantages that can be obtained by means of the inclination, etc. that were explained above with reference to FIG. 5, also relate analogously to the design according to FIG. 6, so that to avoid repetition reference is made to the above statements.

As evident from FIG. 8, not only the mesh screen unit 130 but also the upstream discharge basin 160 and all of the related components are tilted in such s manner that it lies—as in FIG. 3—parallel to the mesh screen unit 130. The front wall of the discharge basin 160 facing the inflow space 125' is elongated in such a manner that, despite the inclination, an overflow level N3 is produced that is situated higher than the level N defined by means of the bottom edge of the opening 122'.

Apart from the above modifications, all of the other designs of the embodiment according to FIG. 6 are identical to those according to FIG. 3 and 4, so that in this respect reference made to the above statements.

I claim:

1. Waste water plant, comprising a discharge basin (20, 120), connected to at least one inflow pipe (26; 126) and at least one outflow pipe (28, 128), a mesh screen unit (30, 130), which is disposed in said discharge basin and which includes a mesh screen having parallel screen bars and a cleaning car, which is movable back and forth and to which is attached a cleaning comb, which is arranged with teeth located between the screen bars of the mesh screen, a partition (24, 124), positioned within the discharge basin (20; 120) and subdividing the discharge basin into an inflow space (25'; 125') and an outflow space (25"; 125") wherein the mesh screen unit (30; 130) is attached to the upper edge of the partition (24; 124) such that the mesh screen unit is one of standing upright and upwardly inclined from a vertical plane at an angle of less than 90° and a damming element increasing the volume of impoundment and arranged in the direction of flow behind the mesh screen unit (30; 130), said damming element having an upper edge which lies above the lower edge of the mesh screen unit.

2. Waste water plant, as claimed in claim 1, wherein the damming element comprises a retaining element (40; 140) which projects into the outflow space (25"; 125")and is attached to the partition (24; 124), said retaining element raising a level of outflow from the inflow space to the outflow space.

3. Waste water plant, as claimed in claim 2, wherein the retaining element comprises one of an element attached to the tilted upper edge of the partition (24; 124) and an element formed by said partition.

4. Waste water plant, as claimed in claim 1, wherein the retaining element (40, 140) forms an angle (α, α') of from 30° to 45° with respect to the vertical plane.

5. Waster water plant, as claimed in claim 1, wherein
the slope of the retaining element (40, 140) relative to the mesh screen unit (30; 130) is adjustable and is fixed in position as a function of the volume of water that accumulates.

6. Waste water plant, as claimed in claim 1, wherein
a level (N1) of the partition (24) lies above a level (N) of an overflow opening (22'), by which the discharge basin (20) is connected to an associated retarding basin (10).

7. Waste water plant, as claimed in claim 1, wherein a discharge basin (160) is located in the inflow space (125')

which is connected to the mesh screen unit (130), is provided with a preliminary chamber (161) and includes an overflow edge (164) lying above the mesh screen unit (130).

8. Waste water plant, as claimed in claim 7, wherein a level (N3) of an overflow edge (164) of the discharge basin (160) lies above a level (N) of an overflow opening (122') by which the discharge basin (120) is connected to an associated retarding basin (110).

9. Waste water plant, as claimed in claim 7, wherein a slope of the retaining element (140) relative to the mesh screen unit (130) is adjustable and is fixed in position by a sensor control, as a function water level in the preliminary chamber.

10. Waste water plant, as claimed in claim 7, 8 or 9, wherein the preliminary chamber (161) of the discharge basin (160) is provided with a screening shaft (162) which is connected by an opening (162') to said preliminary chamber and to which is attached a sliding element (165) for draining the screening.

11. Waste water plant, as claimed in claim 10, wherein the sliding element (165) is operable by a pull element (171) and is connected to a drive member (170) opening and closing the sliding element.

12. Waste water plant, as claimed in claim 1, wherein an upper edge of the mesh screen unit is tilted in a direction of the inflow space.

13. Waste water plant, as claimed in claim 12, wherein the angel of inclination of the mesh screen unit (30, 130) ranges from 15° to 60° with respect to the vertical plane.

* * * * *

UNITED STATES PATENT AND TRADEMARK OFFICE
CERTIFICATE OF CORRECTION

PATENT NO. : 5,490,922
DATED : FEBRUARY 13, 1996
INVENTOR(S) : GRESA

It is certified that error appears in the above-indentified patent and that said Letters Patent is hereby corrected as shown below:

Column 1, line 42, change ", can be absorbed and," to --. The water--;

Column 1, line 47, change "embodiments" to --features--

Column 2, line 63, change "is that" to --is twofold,--;

line 64, change "hands" to --hand--;

line 65, change "hands" to --hand--.

Column 3, line 21, change "1"" to --1'--.

Column 4, line 25, change "180" to --160--;

line 30, change "184" to --164--.

Column 5, line 8, change "surface-" to --surface, which is--;

line 9, change "-of" to --,--;

line 22, delete "shaped-lockingly";

lines 31-38, delete in their entirety and substitute --In an especially simple manner the retaining element can be formed directly by the base plate of the mesh screen unit 30', via which the latter is mounted on the partition 24, overlapping the upper side 224 and is optionally pulled down beyond the edges towards the side faces of the partition 24. Thus the base plate assumes the function of impounding the water level on the inflow side.--

UNITED STATES PATENT AND TRADEMARK OFFICE
CERTIFICATE OF CORRECTION

PATENT NO. : 5,490,922
DATED : February 13, 1996
INVENTOR(S) : GRESA

It is certified that error appears in the above-indentified patent and that said Letters Patent is hereby corrected as shown below:

```
     Column 5, line 48, change "screening falls" to --
screenings fall--.
     Column 6, line 8, change "8" to --6--;
          line 10, change "s" to --a--.
```

Signed and Sealed this

Twelfth Day of August, 1997

BRUCE LEHMAN

Attest:

Attesting Officer

Commissioner of Patents and Trademarks